(12) United States Patent
Heil et al.

(10) Patent No.: US 6,756,020 B1
(45) Date of Patent: Jun. 29, 2004

(54) COMBINED COMPONENT FOR AFTERBURNING ANODE EXHAUST GASES FROM A FUEL CELL SYSTEM AND FOR VAPORIZING EDUCTS DELIVERED BY THE FUEL CELL SYSTEM

(75) Inventors: Dietmar Heil, Schwendi (DE); Bruno Motzet, Weilheim/Teck (DE); Konrad Schwab, Esslingen (DE); Alois Tischler, Aidenbach (DE); Marc Weisser, Owen/Teck (DE)

(73) Assignee: Ballard Power Systems AG, Kirchheim (DE)

( * ) Notice: Subject to any disclaimer, the term of this patent is extended or adjusted under 35 U.S.C. 154(b) by 864 days.

(21) Appl. No.: 09/633,843

(22) Filed: Aug. 7, 2000

(30) Foreign Application Priority Data

Aug. 6, 1999 (DE) .......................... 199 371 52

(51) Int. Cl.[7] .................... B01D 50/00; B01D 53/34; F01N 3/035; H01M 4/86
(52) U.S. Cl. ...................... 422/168; 422/173; 429/40
(58) Field of Search .................... 422/168, 173, 422/177, 179; 429/12–46

(56) References Cited

U.S. PATENT DOCUMENTS

| | | | | |
|---|---|---|---|---|
| 3,801,284 A | * | 4/1974 | Meckler .................. 422/199 |
| 3,901,213 A | * | 8/1975 | Charboneau ............... 122/21 |
| 3,911,896 A | * | 10/1975 | Charboneau et al. ........ 122/21 |
| 3,962,869 A | * | 6/1976 | Wossner .................... 60/298 |
| 4,107,922 A | * | 8/1978 | Wossner .................... 60/298 |
| 4,351,806 A | * | 9/1982 | Galloway .................. 422/206 |
| 5,049,508 A | * | 9/1991 | Hilscher et al. ........... 436/123 |
| 5,190,731 A | * | 3/1993 | Stahl ...................... 422/148 |
| 5,229,222 A | | 7/1993 | Tsutsumi et al. ........... 429/19 |
| 5,709,174 A | * | 1/1998 | Ledjeff et al. ............ 119/167 |
| 5,840,437 A | | 11/1998 | Diethelm ................... 429/14 |
| 6,062,210 A | * | 5/2000 | Welles ..................... 126/208 |
| 6,171,574 B1 | * | 1/2001 | Juda et al. .............. 423/648.1 |
| 6,289,888 B1 | * | 9/2001 | Welles ................... 126/263.01 |
| 2002/0007595 A1 | * | 1/2002 | Maier-Roeltgen et al. .... 48/116 |
| 2002/0064739 A1 | * | 5/2002 | Boneberg et al. ............. 431/5 |

FOREIGN PATENT DOCUMENTS

EP          1075035 A2  *  2/2001

* cited by examiner

Primary Examiner—Kiley Stoner
(74) Attorney, Agent, or Firm—Crowell & Moring LLP

(57) ABSTRACT

A combined component for afterburning anode exhaust gases from a fuel cell system and for vaporizing educts to be fed to the fuel cell system has an exhaust gas catalyzer for afterburning the anode exhaust gases, with a substantially cylindrical casing having an inlet and an outlet connection disposed coaxially to the long axis of the casing, one on a casing cover and the other on a casing bottom. A first gas-permeable inner tube is disposed coaxially to the long axis of the casing and fixedly joined at the gas inlet end to the casing cover, while a second gas-permeable outer tube which is also disposed coaxially with the long axis of the casing and has a radius $r_A$ greater than the radius $r_I$ of the inner tube but smaller than the radius $r_G$ of the casing. The latter is connected gas-tight to the casing cover at the inlet end. A bulk catalyst is disposed in the area between the inner and the outer tube for the catalytic oxidation of the anode exhaust gas. At least one educt to be fed to the fuel cell system is provided in the area between the inner tube and the outer tube, and at least one set of educt flow tubes of the evaporator, through which the educt to be evaporated flows, are carried around the inner tube of the exhaust gas catalyst.

14 Claims, 4 Drawing Sheets

COMBINED COMPONENT FOR AFTERBURNING ANODE EXHAUST GASES FROM A FUEL CELL SYSTEM AND FOR VAPORIZING EDUCTS DELIVERED BY THE FUEL CELL SYSTEM

BACKGROUND AND SUMMARY OF THE INVENTION

This application claims the priority of German application No. 199 371 52.0, filed Aug. 6, 1999, the disclosure of which is expressly incorporated by reference herein.

The present invention relates to a combined component for afterburning anode exhaust gases from a fuel cell system and for vaporizing educts to be fed to the fuel cell system.

U.S. Pat. No. 5,229,222 discloses a fuel cell system in which the anode exhaust gas of the fuel cell is treated with the aid of an exhaust catalyzer before releasing it to the environment.

Furthermore, in hydrogen-powered fuel cell systems it is common practice to produce the hydrogen to be fed to the fuel cell by means of hydrocarbon reformation. For this purpose an appropriate hydrocarbon, methanol for example, and water are first fed to an evaporator and then reformed in a reactor.

In conventional fuel cell systems, the exhaust catalyzer for the afterburning of anode exhaust gases from fuel cell systems and the evaporator are made as separate components. As a result the space required and the total weight of these two components has been relatively great, which proves disadvantageous especially for mobile applications, such as in the automotive field.

U.S. Pat. No. 5,840,437 describes feeding the exhaust gases through a heat exchanger by which then an evaporator is heated, for example, one in which water is evaporated. However, the catalytic post-treatment of exhaust gas is not disclosed in this patent.

One object of the present invention is to provide a fuel cell system with an exhaust gas catalyzer and an evaporator which are uncomplicated, and require low expenditures in terms of cost and weight.

Another object of the invention is to provide such a fuel cell system which is especially suitable for mobile applications.

These and other objects and advantages are achieved by the combined component according to the invention for afterburning the anode exhaust gases of a fuel cell system and for evaporation of educts to be fed to the fuel cell system, in which the tubing of the evaporator is arranged within the exhaust catalyzer, advantageously in direct contact with a catalyst filling provided in the catalyzer, or by a direct coating of the tubing. In this manner an optimum heat exchange can be achieved between the two elements of the combined component. Such a combined component is overall substantially smaller and lighter than was the case in conventional solutions using separate components.

In an embodiment of the component of the present invention, the tubing of the evaporator surrounds the inner tube of the exhaust catalyzer in a substantially spiral manner. With this configuration of the tubing of the evaporator, it is possible to compensate favorably for the thermomechanical stress on the tubing in comparison with conventional evaporators (compensating thermal elongation by means of the spiral shape). The shape can in this case be chosen such that the specific heat input is adapted to the evaporation process; that is, for example, evaporator areas requiring high heat at places within the exhaust catalyzer can be arranged for a correspondingly great energy input.

It has proven advantageous, furthermore, that especially in the two-phase region of the evaporator, the centrifugal forces which are caused by the spiral shape and the velocity of the educts flowing through the evaporator, force the fluid phase against the tube surfaces. Heat exchange or transfer of heat from the tube surfaces to the liquid phase proves to be energetically more desirable than heat transfer to the gaseous phase.

Advantageously, portions of the tubing of the evaporator are made with a reduced cross section. In this way the velocity of the flow of the educts streaming through the evaporator are optimally adapted to the thermal transfer of the exhaust gas catalyzer. It is expedient to arrange a reduction of the tubing cross section, especially in the liquid phase area.

It is preferred that the cross section be reduced by means of inserts or linings placed in the tubing. Such inserts can easily be placed at the desired locations within the tubing. The inserts can be installed centrally within the tubing, for example, so that a "bursting" of drops of the liquid phase of the educts can be achieved. This results in an enlargement of the droplet surface area.

The inner surfaces and/or outer surfaces of the tubes are advantageously textured. By means of such a configuration, in the form of vortex tubes, for example, the transfer of heat between the exhaust gases and the educts flowing through the tubes of the evaporator are additionally improved. For example, by an appropriate texturing of the inner surfaces, turbulence can be achieved at the tubing surface in the liquid and/or gaseous phase of the educts. An appropriate texturing of the outer surfaces will positively influence the transfer of heat between the tubing and the catalyst surrounding them.

It is desirable to provide a catalytic coating on the outer surfaces of the tubes to achieve good transfer of heat to a catalytic material. Especially in the case of textured interior surfaces of the tubes, a further improved transfer of heat to the catalytically coated exterior surfaces of the tubing can be assured. If the exterior surfaces of the tubes are simultaneously textured, an enlargement of the catalytically coated area can be achieved.

According to an additional embodiment of the combined component according to the invention, the tubes are configured substantially as a set of single tubes running parallel to one another and surrounding the inner tube of the exhaust gas catalyzer in a substantially semicircular manner, and the educts can be fed through a feeder duct communicating with the single tubes, and the at least partially vaporized educts can be carried away through a outlet duct communicating with the outlet end of the single tubes. A tubing arrangement configured in this manner proves to be especially simple and inexpensive to manufacture.

Other objects, advantages and novel features of the present invention will become apparent from the following detailed description of the invention when considered in conjunction with the accompanying drawings:

DETAILED DESCRIPTION OF THE DRAWINGS

Figure 1:
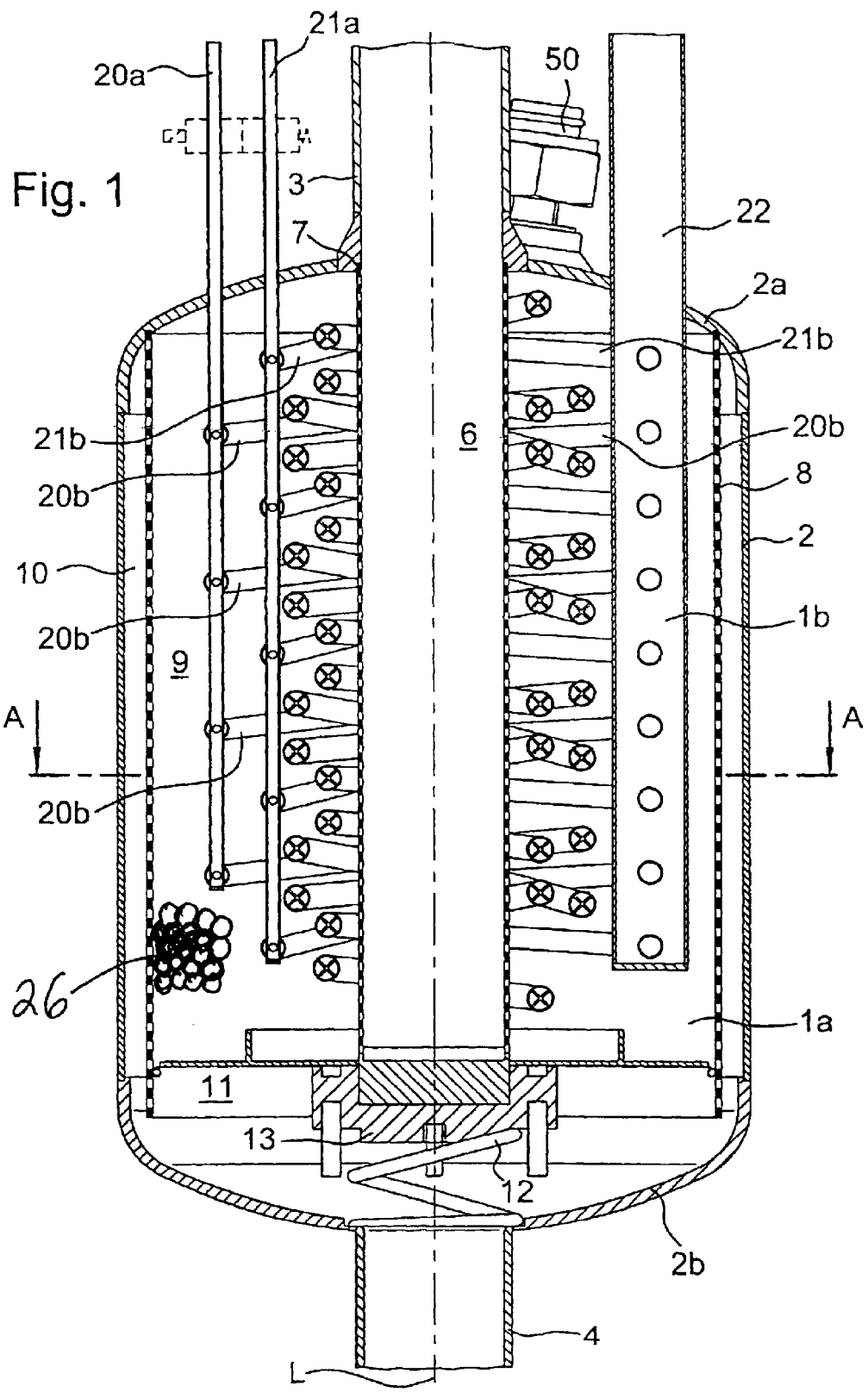
FIG. 1 is a side elevation in section of a first embodiment of the combined component according to the invention.

FIG. 1 represents a first embodiment of the combined component according to the present invention. The combined component has an exhaust gas catalyzer indicated as a whole at 1a, and an evaporator indicated as a whole at 1b. The exhaust gas catalyst 1a has a cylindrical casing 2 with a cover 2a and bottom 2b. In the area of the cover 2a, an inlet connection 3 is coaxial with the long axis L of the casing. Accordingly, an outlet connection 4 is provided, likewise coaxial with the long axis L of the casing. The inlet and outlet connections serve to connect the exhaust gas catalyst to lines of a fuel cell system not shown in detail.

Inside of the casing 2 is a first gas-permeable inner tube 6 coaxial with the long axis L of the casing. The inner tube 6, which preferably consists of perforated metal, is fixedly connected on the gas inlet end to the cover 2a. For this purpose the inner tube 6 can be screwed into a corresponding socket 7 in the inlet connection 3 or else inserted and then welded. Furthermore, a second gas-permeable outer tube 8 coaxial with the long axis L of the casing is provided. The outer tube 8 is likewise joined in a gas-tight manner to the cover 2a on the inlet end. For example, the outer tube 8 is welded to the cover 2a.

The outer tube 8 has a radius r, which is greater than the radius $r_I$ of the inner tube 6. At the same time, however, the radius $r_A$ of the outer tube 8 is smaller than the radius $r_G$ of the cylindrical casing 2 ($r_I<r_A<r_G$).

Thus an inner annular space 9 forms between the inner tube 6 and the outer tube 8. At the same time an outer annular chamber 10 is formed between the outer tube 8 and the cylindrical casing 2. Preferably, the radii of the tubes 6 and 8 and of the casing 2 are chosen such that only a narrow outer annular space 10 is formed, while the inner annular space 9 occupies the greater part of the volume in the casing.

Furthermore, a circular floor 11 movable along the long axis L of the casing is provided, which reaches into the outer tube 8 and seals it tightly on the outlet end. For this purpose the outside diameter of the floor 11 is made substantially equal to the inside diameter of the outer tube 8. The movable floor 11 is urged by a spring 12 contrary to the direction of flow of the gas with a force such that the floor 11 is urged by the spring toward the casing cover 2a. The spring 12 is also coaxial with the long axis L of the casing and thrusts against the casing bottom 2b at one end near the outlet connection 4. At the other end the spring 12 thrusts against a raised portion 13 which is likewise coaxial with the casing's long axis L at the bottom of the floor 11. Instead of the spring 12, other elastic means can be used which exert a corresponding force on the floor 11.

The evaporator 1b is placed in the inner annular space 9 which is defined radially by the gas-permeable tubes 6 and 8 and in the direction of the long axis L by the casing cover 2a and the floor 11. In the embodiment represented, the evaporator has two sets of educt flow tubes which separate the two different educt gases, for example, methanol and water, at the inlet end and bring them together at the outlet end. The tubing system, for the evaporation of for example methanol, has an inlet tube 20a from which one set of educt flow tubes 20b branch off and substantially spiral around the inner tube 6. The tubes 20b lead into an outlet tube 22.

Accordingly, for evaporating water, an inlet tube 21a is provided, from which a second set of educt flow tubes 21b branch off and substantially spiral around the inner tube 6 of the exhaust gas catalyzer and likewise lead into the outlet tube 22. In the outlet tube 22, therefore, the educts delivered through the educt flow tubes 20a and 21a are mixed together.

In the embodiment represented in FIG. 1, the tubes 20b and 21b extend spirally once about the inner tube 6 of the exhaust gas catalyst. It is likewise possible for the tubes 20b and 21b to form several turns around the inner tube 6.

The inner annular space 9 into which the evaporator's tubing system shown is installed is furthermore filled with a bulk catalyst 26. This is preferably a metal in the form of pellets containing noble metal. The combustible components of the anode gas are oxidized as completely as possible by the catalyst material. The size of the pellets and the diameter of the holes in the tubes 6 and 8, which are preferably made of perforated metal, are selected such that the pellets cannot pass through the perforated metal. The two tubes 6 and 8 are hermetically closed off from the casing cover 2a, so that again no catalyst material can escape from the inner annular space 9. In the direction of the gas flow, the inner annular space is lastly defined by the floor 11. This bottom does not have to be hermetically sealed from the outer tube 8, but it must be configured such that no catalyst material can pass between the outer tube 8 and the floor 11. For this purpose, for example, a flexible metal mesh can be provided which scrapes along the inner surface of the outer tube 8 in the event of movement of the floor 11. The wire mesh is not shown in the drawing so as to provide a clearer view.

A charging connection whereby the bulk catalyst can be placed in the inner annular space 9 between the inner and outer tubes 6 and 8, respectively, is indicated at 50.

Figure 2:
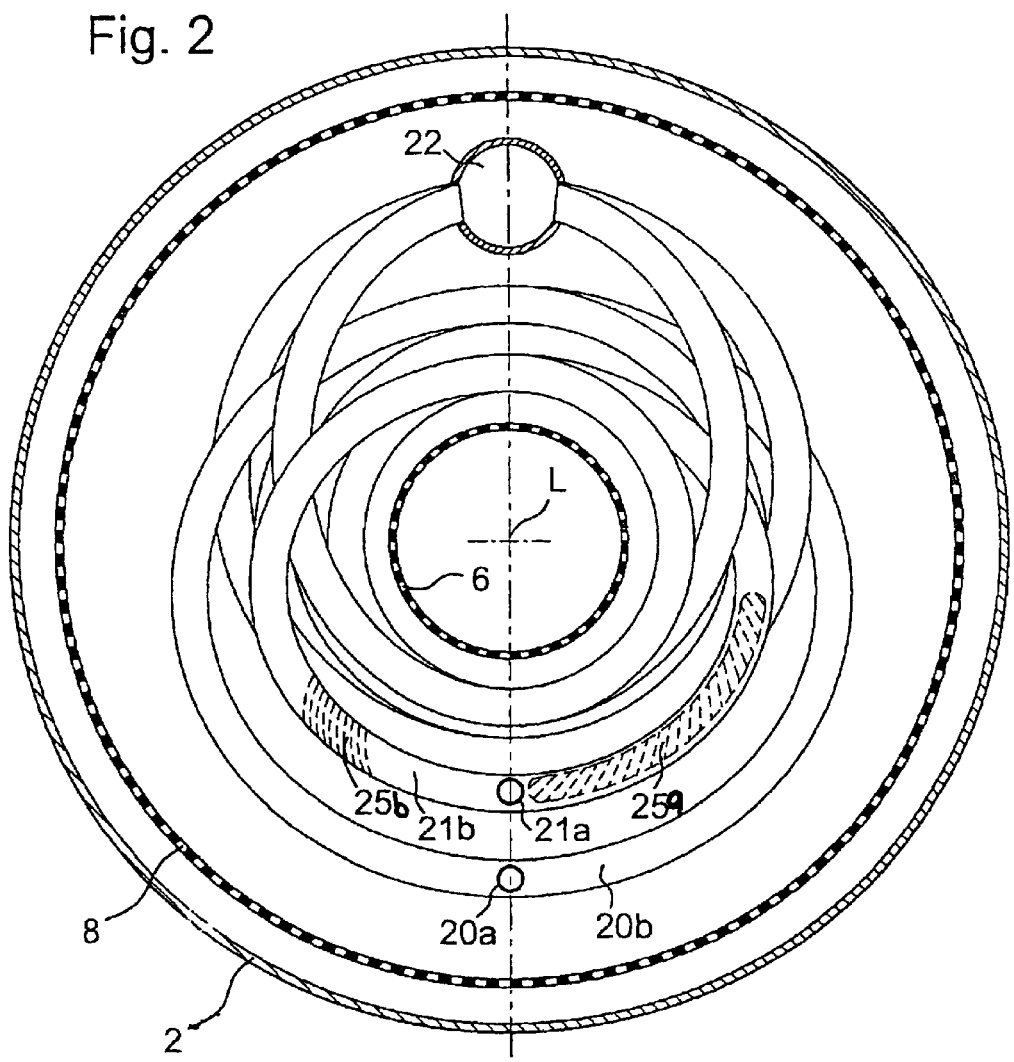
FIG. 2 is a sectional view of the combined component according to the invention of FIG. 1 in a side view taken along line A—A of FIG. 1.

In FIG. 2 the tubing system of the evaporator is represented in a section taken along line A—A. Here the transitions between the inlet tubes 20a and 21a and the spiral educt flow tubes 20b and 21b can be seen especially well. It can furthermore be seen that, as already explained, tubes 20b and 21b lead into the outlet tube 22.

In FIG. 2 it can be seen that a lining 25a is provided centrally in tube 21b. Such a lining reduces the tube's cross section and thus in this area it increases the velocity of flow of the educts being evaporated. It is possible to provide such linings 25a in additional tubes and to vary their length and width according to the desired flow profile. Such linings prove to be especially desirable in the range of the liquid phase of the educts being evaporated, that is, near the junction between the inlet tubes 20a and 21a, and the spiral educt flow tubes 20b and 21b, respectively.

Especially in the two-phase range in which both liquid and evaporated educt is present, the liquid phase is urged against the radially outer tube surfaces by centrifugal forces produced by the spiral shape of the tubes 20b and 21b as well as the velocity of flow of the educts through the tubes. This assures in an especially desirable manner that heat developing due to the afterburning of the exhaust gas in the bulk catalyst can be optimally transferred through the outer sides of the tubes 20b and 21b to the liquid phase carried on the inner surface of the tubes.

By texturing the inner surfaces of the tubes 20b and 21b to create vortex tubes, the thermal transfer can be further improved. It is to be noted that the tubes' outer surfaces can also be textured or coated with a catalytic material to improve heat transfer and to enlarge a catalytically active area. The texturing of the inner surfaces and the texturing/ catalytic coating of the outer surfaces of the tubes 20b and 21b is represented schematically at 25a and 25b, respectively. Such vortex tubes also have a larger surface area than tubes without textured inner surfaces, so that if the outer surface of the tubes is coated with catalytic material, a more effective catalytic enhancement of the evaporation can be achieved.

An additional embodiment of the combined component according to the invention will now be explained with reference to FIGS. 3 and 4. Similar components are identified here by the same reference numbers as in FIGS. 1 and 2. Description of identical features will not be given at this point.

Figure 3:
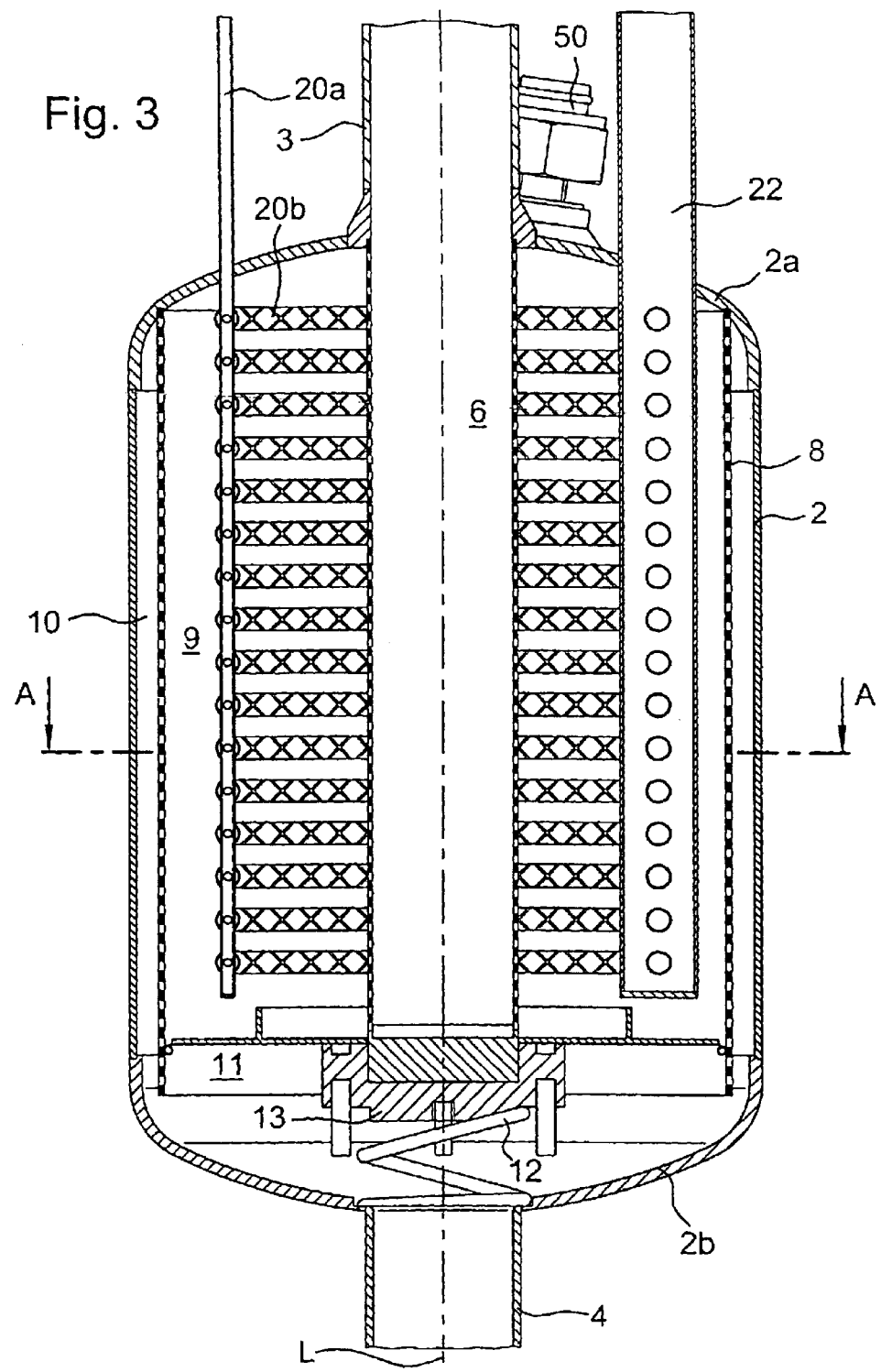
FIG. 3 is a view corresponding to FIG. 1 of a second embodiment of a combined component according to the invention.

In FIG. 3 it can be seen that only one inlet tube 20a is provided for bringing educts into the evaporator. Of course, two or more inlet tubes can be provided. In contrast to the spiral tubes of the first embodiment, a set of educt flow tubes 20b in the second embodiment runs substantially semicircularly parallel to one another around the inner tube 6 of the exhaust gas catalyzer and lead into the outlet tube 22. A parallel arrangement of the tubes 20b of this kind proves very easy to make. Here too the life of the tubing system of the evaporator is longer than in conventional evaporators, since the thermal stress in the tube cluster configuration shown is less than in the conventional plate design. In comparison with conventional plate evaporators, tube cluster evaporators, as used according to the present invention, have a substantially lower mass for the same pressure load and evaporative capacity.

The combined components according to the invention prove advantageous in that even in a cold start the evaporator is heated. The combined component according to the invention is furthermore distinguished by a very simple circuit of the media. The tubing used, especially the parallel tubes 20b according to the second embodiment, can be obtained in a very inexpensive manner by the use of half-products and standard shaping methods.

The control of the flow and the manner of operation of the exhaust gas catalyzer will now be described. The anode exhaust gas of the fuel cell system is carried together with an oxidant, preferably air, through the inlet connection 3 and the inner tube 6 coaxially to the long axis of the casing, and into the exhaust gas catalyzer 1. The inner tube 6 serves as the feed line and is preferably not filled with catalyst material.

As already stated, the surface of the inner tube 6, preferably in the form of perforated metal, is permeable to gases. The size of the holes is selected such as to assure a sufficient delivery of the gas mixture to the inner annular chamber 9, but at the same time prevent escape of catalyst particles into the inner tube. The gas mixture now passes radially from the inner tube 6 into the inner annular space 9. There the gas mixture continues to flow radially through the inner annular space filled with the catalyst material 26 and then passes into the outer annular space 10 through the permeable periphery of the outer tube 8. The periphery of the outer tube is also preferably in the form of a perforated metal. The heat produced by the catalytic afterburning of the exhaust gases can be effectively transferred to the two sets of educt flow tubes 20b and 21b which are completely surrounded by catalyst material 26. Removal of the exhaust gases takes place through the outlet connection 4.

Since the gas flows radially through the annular space 9, the available volume in the direction of flow increases. Thus pressure losses in the exhaust gas can be kept minimal.

It proves to be especially beneficial to chose an energy saving configuration of the space between the tube 6 and the tubing 20b and 21b of the evaporator surrounding it in spiral form. It can be seen in FIG. 2, for example, that the tubes 20b and 21b of the inlet tubes 20a and 21a are brought relatively close to tube 6 and then open into the outlet tube 22 which again is at a relatively great distance from tube 6.

The most energy is available directly around the tube 6, since when the exhaust gases enter the catalyst material the maximum fuel concentration and thus also the highest conversion is present.

By the arrangement of the tubes 20b and 21b that has been described, the media to be evaporated are first preheated in the area of medium heat (relatively great distance from tube 6 in the vicinity of feed lines 20a, 21a), then evaporated in the area of maximum energy (directly adjacent the tube 6), and finally again superheated in the area of medium energy (around the outlet tube 22).

By the arrangement of two inlet tubes 20a and 21a and of a common outlet tube 22, as represented in FIG. 2, an optimum load matching (by valves), for example, can be performed.

With reference to the embodiment of FIGS. 1 and 2, it is especially possible to feed water through one of the inlet tubes 20a and methanol to the other inlet tube 21a, the steam-and-methanol mixture being formed first in the outlet tube 22.

Figure 4:
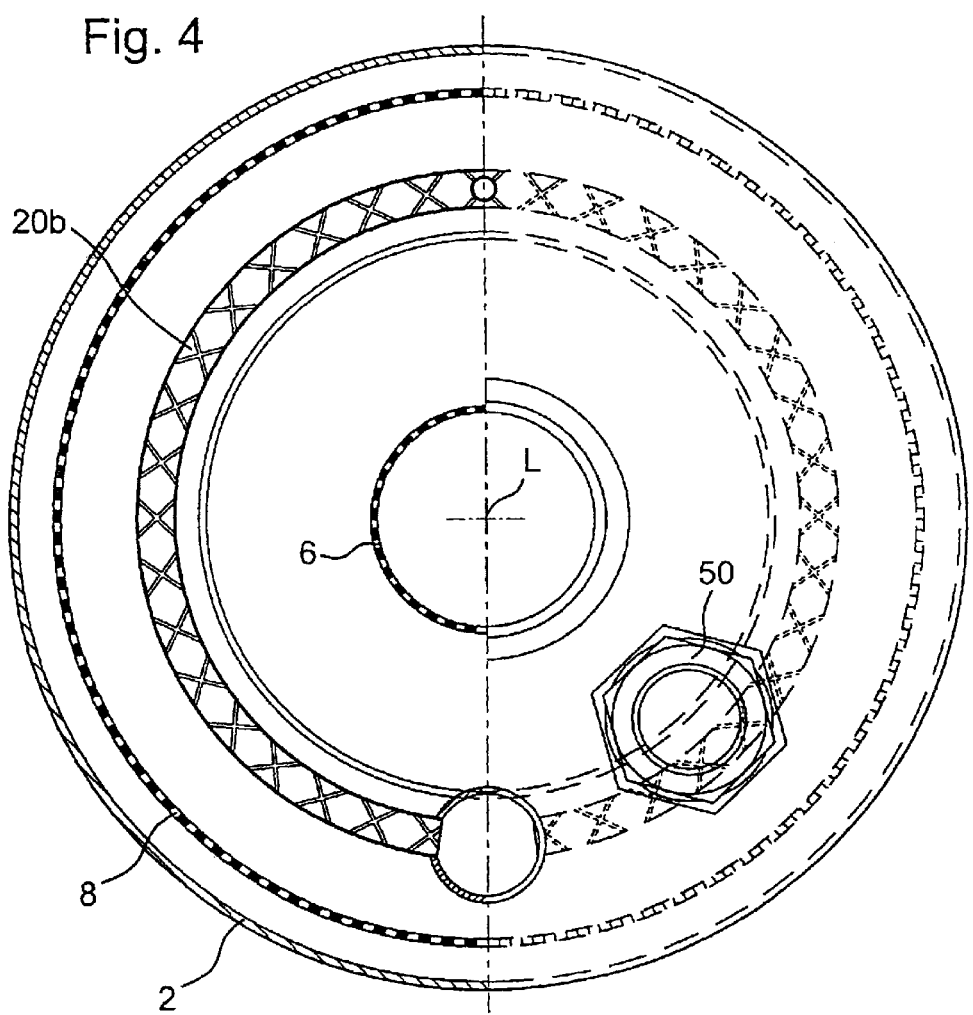
FIG. 4 is a view corresponding to FIG. 2 of the combined component according to the invention represented in FIG. 3.

The embodiment of the combined component according to the invention represented in FIGS. 3 and 4 is characterized especially by the fact that, due to the substantially semicircular shape of the tubes 20b around tube 6, the specific heat input can be adapted to the evaporating process, i.e., areas of great heat demand are arranged at places of great energy input.

According to the above-described embodiment a bulk catalyst filling is provided in catalyzer 1a. It has been mentioned that, in addition to this fill of catalytic material, coated tubes can be used advantageously. It is to be noted that the catalytic effect to be achieved according to the invention can be obtained in any manner, for example, only with catalytically coated tubes as have already been described, or by the stated combination of a catalyst charge with coated tubes. The external surfaces of the tubes can also be formed by a nonwoven coat or covered by such a nonwoven material. Also other catalytic components or measures can be chosen which are not set forth in detail.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined component for a fuel cell system, comprising:
   an exhaust gas catalyzer for afterburning anode exhaust gases from the fuel cell system; and
   an evaporator for evaporating at least one educt to be fed to the fuel cell system; wherein
   the exhaust gas catalyzer includes
      a casing with a casing cover and a casing bottom,
      a gas inlet and a gas outlet connection disposed on the casing cover and on the casing bottom respectively,
      a gas-permeable inner tube arranged coaxially with a long axis of the casing affixed to the casing cover, and a gas-permeable outer tube disposed coaxially with the long axis of the casing joined to the casing cover, a catalyst material in an area between the inner and the outer tube for the catalytic oxidation of the anode exhaust gas, the outer tube having a radius ($r_A$) greater than the radius ($r_I$) of the inner tube, yet smaller than the radius ($r_G$) of the casing; and the evaporator is disposed between the inner tube and the outer tube, and includes at least one inlet tube, an outlet tube, and at least one set of educt flow tubes connected between said at least one inlet and said outlet tube and passing around the inner tube.

2. The component according to claim 1, wherein said at least one set of educt flow tubes is substantially semicircularly parallel to one another.

3. The component according to claim 1, further comprising as part of the evaporator:

a second inlet tube and a second set of educt flow tubes.

4. The component according to claim 3, wherein both sets of educt flow tubes spiral at least once around the inner tube.

5. The component according to claim 1, wherein said at least one set of educt flow tubes has sections of reduced cross section.

6. The component according to claim 3, wherein said at least one set of educt flow tubes has sections of reduced cross section.

7. The component according to claim 5, wherein said at least one set of educt flow tubes have linings which create sections of reduced cross section.

8. The component according to claim 6, wherein said at least one set of educt flow tubes have linings which create sections of reduced cross section.

9. The component according to claim 1, wherein an inner surface of said at least one set of educt flow tubes is textured.

10. The component according to claim 3, wherein an inner surface of said at least one set of educt flow tubes is textured.

11. The component according to claim 1, wherein an outer surface of said at least one set of educt flow tubes is textured.

12. The component according to claim 3, wherein an outer surface of said at least one set of educt flow tubes is textured.

13. The component according to claim 1, wherein an outer surface of said at least one set of educt flow tubes is catalytically coated.

14. The component according to claim 3, wherein an outer surface of said at least one set of educt flow tubes is catalytically coated.

* * * * *